Figure 1A:
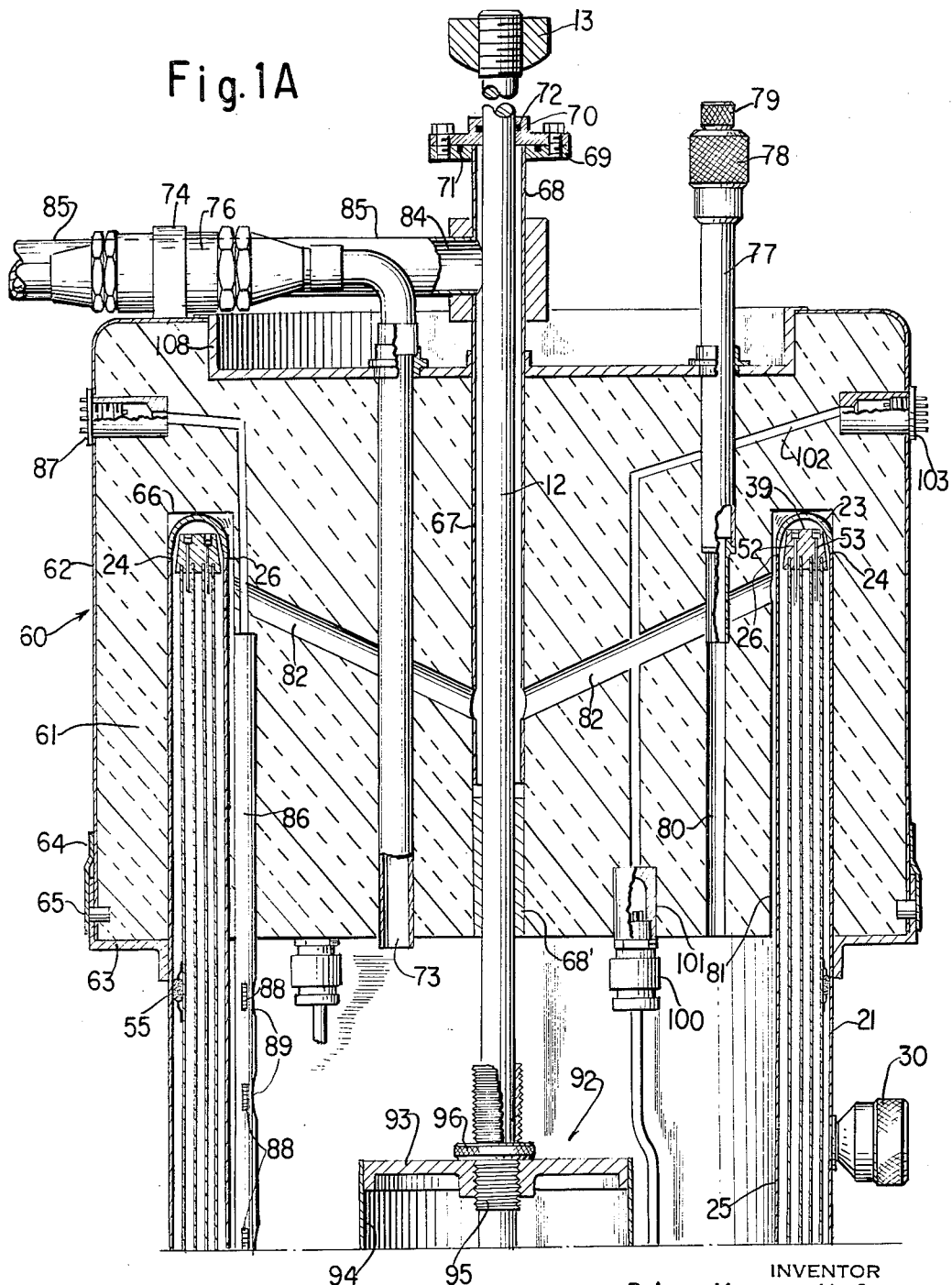

Oct. 19, 1965   R. M. McCLINTOCK   3,212,320
TENSILE TESTING CRYOSTAT
Filed Feb. 2, 1962   3 Sheets-Sheet 2

INVENTOR
RALPH MICHAEL McCLINTOCK
BY
Robertson & Smythe
ATTORNEYS

Oct. 19, 1965  R. M. McCLINTOCK  3,212,320
TENSILE TESTING CRYOSTAT
Filed Feb. 2, 1962  3 Sheets-Sheet 3

INVENTOR
RALPH MICHAEL McCLINTOCK
BY
Robertson *my* Smythe
ATTORNEYS

United States Patent Office 3,212,320
Patented Oct. 19, 1965

3,212,320
TENSILE TESTING CRYOSTAT
Ralph Michael McClintock, Boulder, Colo., assignor to Ametek, Inc., New York, N.Y., a corporation of Delaware
Filed Feb. 2, 1962, Ser. No. 170,728
6 Claims. (Cl. 73—15.6)

This invention relates to tensile or similar testing machines and particularly to one suitable for low temperature use.

In the prior art, various arrangements have been suggested for subjecting to a low temperature a specimen to be tested under tensile or other conditions. This becomes particularly critical when the temperature is quite low, for example, as low as 4° Kelvin. The necessity for such testing occurs in the many uses of cryogens for various purposes, for example, in the testing of materials for use in the manufacture of missiles and the like. In the prior art, one of the problems has been to conserve heat and to properly transmit the pulling forces to the specimen. Another problem has been that of obtaining temperatures intermediate to the boiling point of the various cryogens.

The principal object of the invention is to provide a cryostat which will reduce to a minimum the transfer of heat to the interior of the cryostat and properly transmit to a test specimen the necessary forces.

Another object of the invention is to provide an arrangement in which intermediate temperatures can be obtained.

Another object of the invention is to provide such an arrangement for efficient transfer of tensile forces to the specimen.

Still another object of the invention is to provide such an improved arrangement for preventing the transfer of heat from the exterior to the interior of the space in which the specimen is located.

In one aspect of the invention, a Dewar type flask may comprise vertical, concentrically arranged cans providing an annular space therebetween. Each can may be provided with a closed bottom and the cans may be axially spaced apart a small distance. The opposite ends of each can may be joined by a semitoroidal shaped element or the like providing an open interior to the inner can, and a closure for the top of the annular space between the cans.

In another aspect of the invention, within the inner can and at its bottom may be rigidly fixed thereto an alignment flexure element within which one end of a test specimen may be attached. The other end of the test specimen may be fixed to an upper rod, the upper end of which is fixed to the upper chuck jaws of a tensile testing machine.

In still another aspect of the invention, a lower tensile rod may be rigidly fixed to the outside of the bottom of the outer can, and its lower end may be attached to the lower chuck jaws of a tensile testing machine. With such a construction, it is evident that the tensile forces are transmitted to the test specimen through the walls of the Dewar flask arrangement.

In another aspect of the invention, a plurality of radiation shields in the form of concentric tubes may be located within the annular space between the inner and outer cans forming the Dewar flask arrangement.

The above, other objects and novel features of the invention will become apparent from the following specification and accompanying drawings which are merely exemplary.

Figure 1B:
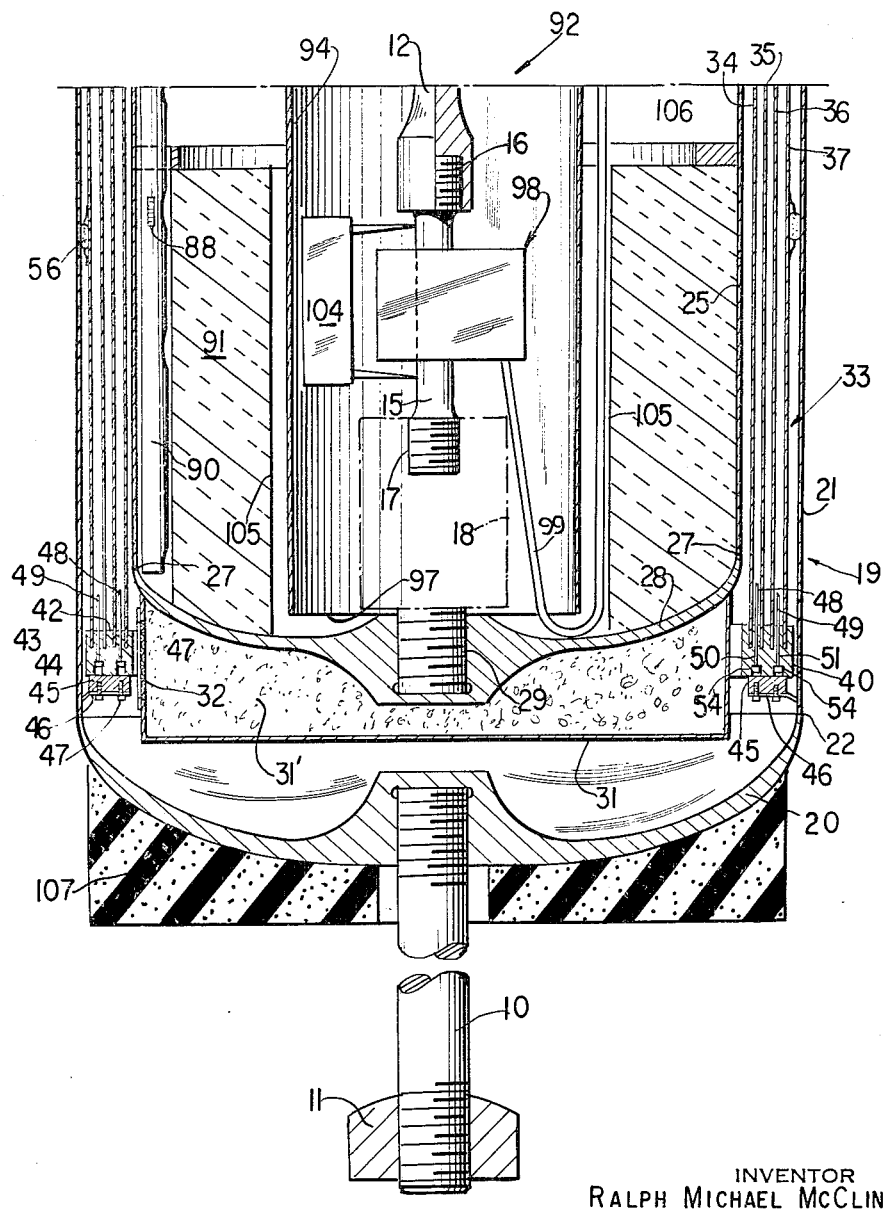
Figure 2:
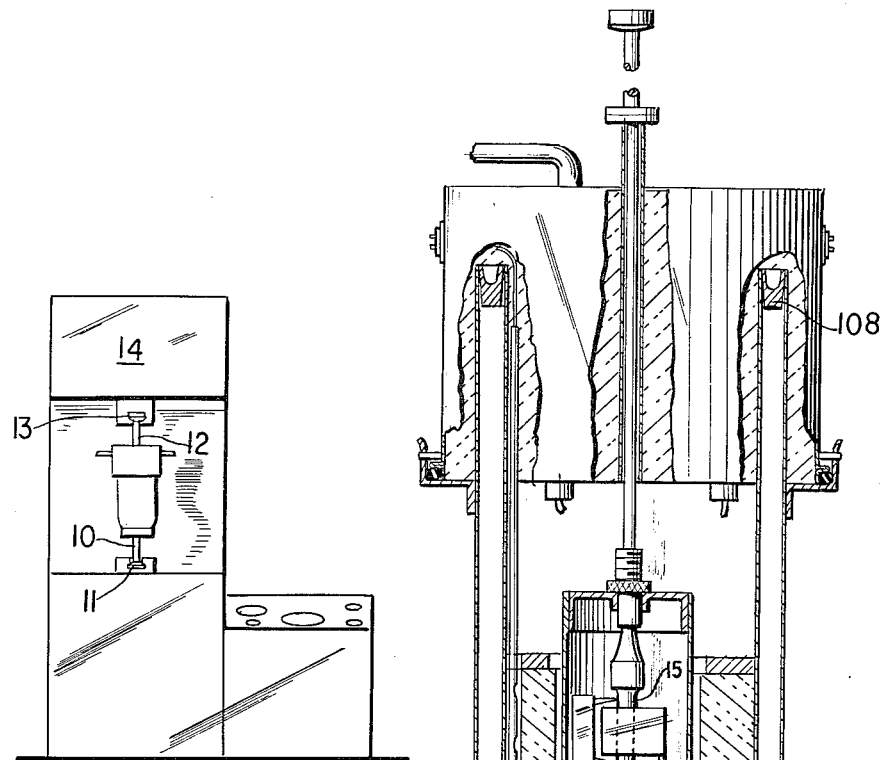

In the drawings:
FIGS. 1A and 1B are sectional elevational views of parts of a cryostat to which the principles of the invention have been applied;
FIG. 2 is a sectional elevational view of a modified form of the invention; and
FIG. 3 is an elevational view of a tensile testing machine with the cryostat of the invention applied thereto.

Referring to FIGS. 1A and 1B, the principles of the invention are shown as applied to a Dewar type flask arrangement that encloses the specimen to be tested and its related parts.

Figure 3:
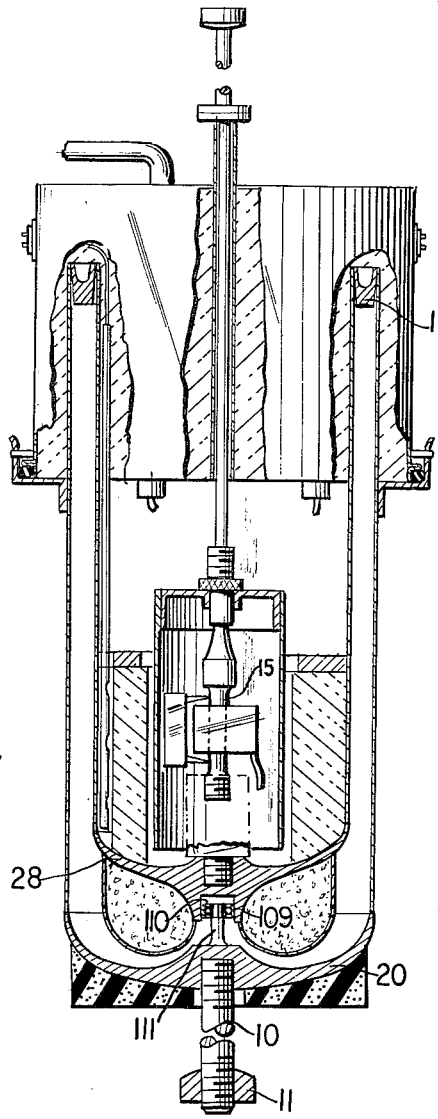

A lower tension rod 10 may have a nut 11 thereon which can be fitted into the lower clamping head of a testing machine as shown schematically in FIG. 3. An upper tension rod 12 has a nut 13 threaded thereon that is insertable into the upper clamping head 14 (FIG. 3) of the tensile testing machine.

A specimen 15 may be threadedly engaged into the socket 16 of the upper tension rod 12 and into the socket 17 of an alignment flexure element 18. The specimen 15 may be of the standard and conventional shape as prescribed for testing various samples. The force from the lower tension rod 10 is transmitted to the specimen 15 through a double-walled Dewar-like vessel arrangement 19. This arrangement may comprise a lower head 20 with an outer side wall 21, the lower head being joined to the outer side wall by a suitable weld joint 22. At the top of the cylindrical outer wall 21 (FIG. 1A), a semitoroidal shaped element 23 is joined at 24 to the outer wall 21 by suitable welding. The inner wall 25 comprises a cylindrical body which is joined at 26 to the semitoroidal element 23 and at its bottom surface 27 to an inner head 28 by suitable weld joints. The inner head 28 has a screw threaded socket 29 for receiving the alignment flexure element 18. The force is thus transmitted to the specimen 15 through this previously described system of elements which comprises the double walls of the Dewar-like vessel 19. The space between the double walls 21, 25 is evacuated by a suitable vacuum pump through a seal-off valve 30 which is connected to the outer wall 21 in any suitable manner.

In order to test the specimen 15 at the desired temperature, it is necessary to supply the interior of the Dewar flask 19, after the cover is placed thereon as will be described hereafter, with a suitable cryogen. As an example, if a temperature of about 4° K. (Kelvin) is desired, liquid helium is used; if about 20° K. is desired, liquid hydrogen can be used; or if about 76° K. is desired liquid nitrogen is used. In view of the very low temperature, it may be desirable to shield the specimen 15 from conduction, radiation and convection effects so as to improve efficiency. The conduction and convection effects are minimized by means of the evacuated double wall arrangement of the Dewar flask 19. In order to maintain the vacuum therein, a receptacle or chamber 31 is provided for holding a substance 31' which serves as a "getter." Such a substance adsorbs the residual gas within the vacuum enclosure. One example of such a substance is activated coconut charcoal. The chamber 31 has screen elements 32 in the sides thereof to permit communication between its interior and the interior space between the walls 21, 25 of the Dewar flask 19.

The problem of radiation at such low temperatures also may be serious and in order to inhibit such a radiation shield assembly 33 may be provided. Such an assembly may comprise a concentric arrangement of cylindrical copper shields 34, 35, 36 and 37, for example, which are suspended within the vacuum enclosure between the walls 21 and 25 of the Dewar vessel 19 and which are thermally insulated from each other by a suspension system including a series of plastic blocks 39, of such material as "Mylar" or a suitable polyamide, at the upper end of the assembly within the semitoroidal member 23, and a similar set of plastic blocks 40 at the lower end of the annular space between walls 21 and 25. The blocks 39 and 40, for example, may be about one-half inch on a side and they may be spaced at intervals peripherally around the Dewar flask 19. Each of these blocks contains a set of arcuate grooves 41, 42, 43, 44 which receive the upper and lower ends of the radiation shields 34, 35, 36 and 37 and retain them in positions adjacent to each other. Because of the lower thermal conductivity of the plastic, they provide thermal insulation between the shields. The blocks 40 may be supported on a ring 45 which is held by clips or brackets 46 spaced peripherally around the bottom of the Dewar flask 19, the ring being held in place by suitable screws 47. The blocks 39 and 40 are held in place on the top and bottom of the series of radiation shields by a series of cords 48 and 49 that run between them. In order to maintain the radiation shield assembly together, cords 48 and 49 are threaded through apertures 50, 51 in each of the lower blocks and through apertures 52, 53 in the upper blocks. Such cords may be made of any suitable plastic having a low coefficient of conductivity, for example, a polyester such as that sold under the trade name "Dacron." These cords after being threaded therein may be stretched, and a suitable holding element 54 may be clipped thereon, following which they are released, and hold the parts in assembled relationship. The cords 48, 49 also serve the purpose of separating the various radiation shields 34, 35, 36 and 37 in the event they should become distorted in any manner. It also is possible, if desired, to run a separate set of cords between the interior to shields 35 and 36. In positioning the radiation shield assembly within the Dewar flask 19, cords 55, 56 of a suitable plastic such as Dacron, glass or other material may be wound around the periphery of the exterior wall of the shields.

If desired, the interior of the cylindrical walls 21 and 25 of the Dewar flask may be coated with copper, gold or other material having low emissivity. The walls of the Dewar flask 19, because of the strength desirability, may be made of a titanium alloy such as an alloy consisting of 5% aluminum, 2½% tin, which is a weldable alloy and is ductile and possesses a tensile yield strength of 120,000 p.s.i., the ductility being present at low temperatures. It is preferable that the walls 21 and 25 be relatively thin so as not to conduct heat from the outside of the Dewar vessel 19 into the interior thereof. Thus, it becomes necessary or desirable to choose the dimensions of the outer walls, employing a figure of merit for the various available metals which can be obtained from the relation between the modulus of elasticity divided by the thermal conductivity of the chosen metal. The reason for this is that in transmitting the tensile forces through the exterior walls, the principal problem is a question of buckling or bending of the walls in which the modulus of elasticity is the critical figure. Other metals may be chosen, for example, Austenitic stainless steel.

A cover for the Dewar flask assembly 19 is shown generally at 60, such cover comprising a body 61 of insulating material such as blown polystyrene which is sold under the trademark "Styrofoam." The body 61 may include suitable apertures wherein for receiving the variout parts. The cover 60 may be enclosed in a metallic case 62, said case being supported in a cover ring 63, the latter being suitably welded or fastened to the exterior wall 21 of the Dewar flask 19. The cover casing 62 may be provided with a rubber seal arrangement 64 having locking pins 65 that act through a bayonet-type connection so that when the cover is put into position on the cover ring 63, it may be turned and the rubber arrangement 64 will then serve as a seal to prevent passage of gas from the interior of the Dewar flask 19 to the exterior. The cover has an annular groove 66 for receiving the upper end of the Dewar flask 19. A central aperture 67 is provided in cover 60 for the passage of the upper tension rod 12 therethrough, there being a suitable seal plug 68' of a suitable material at the lower end of aperture 67. The upper end of the tension pull rod 12 is sealed relative to the cover by means of a tube 68 which has a flange 69 thereon for receiving the upper tension rod split flange 70, the latter having O-rings 71, 72 for sealing the parts relative to each other.

A relief line 73 for overpressure may be provided and it may include a relief valve 76 therein supported on a bracket 74. A transfer port 77 may have a transfer line attached thereto through a joint 78 which has a plug 79 for normally closing the same. The liquified gas may be transferred through an aperture 80 into the interior of the Dewar flask 19. In order to refrigerate the inner wall 25 of the flask 19, a passage 81 is provided between the interior wall 25 and the cover 60 so that the gas can pass upwardly therebetween, thence downwardly through extending passage 82 and into the tube or aperture 67. The gas then will cool the upper tension rod 12 and pass out through port 84 to the gas exit line 85.

In order to sense the liquid level, a liquid level sensing rod or tube 86 may depend from the cover, the electrical leads therefrom being connectable at 87 to any suitable indicating or recording instrument. In one form, the liquid level sensor may comprise a plurality of carbon resistors 88 located adjacent apertures 89 in the rod or the tube 86. The lower end of the rod 86 is inserted into an aperture 90 in the waste-volume element 91, if such is employed, as will be described hereinafter.

If it is desired to go to an intermediate temperature between 4° K. and 76° K. or to other intermediate temperatures, a gas chamber arrangement 92 may be used. The chamber 92 may comprise a cover 93 and a depending cylindrical skirt member 94. The cover 93 may be screw threadedly held at 95 onto the upper tension rod 12. The screw threads, for example, may be made of a plastic, and suitably cemented onto the upper tension rod 12. The lock nut 96 is used to lock the parts in place when properly adjusted. The lower edge 97 of the chamber 92 preferably should be relatively close to the upper head 28 of the interior wall of the Dewar flask 19.

A heating element assembly 98 may be clamped onto the specimen 15. Said heating element assembly may include a suitable heating element therein which can be connected by means of leads 99 to a plug 100 which, in turn, is mounted in a socket 101 in the cover 60, socket 101 having leads 102 leading to an exterior plug 103. An extensometer of any suitable type, illustrated at 104, is also attached to the specimen. By placing the heating element assembly 98 directly on the specimen 15, heat is transferred directly thereto as compared with heating the upper tension rod 12 and the lower alignment flexure element 18, in which latter case heat is lost and will be transferred to the cover 93 and other parts of the apparatus which is not desirable. The waste-volume filler member 91 can be used when the gas chamber 92 is employed, such having a central aperture 105 therein for receiving the gas chamber.

When it is desired to assemble the cryostat with the gas chamber in place, the gas chamber 92 is slid down over the upper tension rod 12. The jam nut 96 then is put into place and the upper tension rod 12 is slipped through the central aperture in the cover 60. Thereafter, the split flange 69, 70 is put into place so as to render effective the seal between the O-rings 71 and 72. Then the specimen 15 and heater element 98 are assembled and screw threadedly joined at 16 to the upper tension rod 12, and extensometer 104 is put in place on the specimen 15. Thereafter, the gas chamber 92 is screw threadedly engaged at 95 and the lock nut 96 then is screwed down so as to lock the gas chamber 92 in its desired location. The entire cover 60 and assembly is connected to the Dewar flask 19, and by turning the upper tension rod 12, the specimen 15 is screw threadedly engaged at 17 into the alignment flexure element 18.

Before lowering the cover 60 and assembly into place, the electrical connections are joined to their respective plugs; sealing plug 68 is slid into place so as to block passage from the interior of the Dewar flask 19 up through pipe 67, except through passages 81 and 82, thus to provide for the refrigeration of the upper walls of the Dewar flask 19; and a retaining ring 106, which may be an expanding split-type ring, may fit on top of the waste volume member 91 and hold the parts in place. Finally, the cover is slid down on the tension rod 12 so that the sealing gasket 64 and locking pins 65 engage the cover ring 63. After the cryostat is assembled, the tension rods 10 and 12 can be placed in the cross heads of the testing machine in the usual manner, as shown in FIG. 3. The cryostat shock absorber 107 can be placed on the bottom of the Dewar flask arrangement 19 so as to take up any shocks when the specimen 15 is broken, such being glued onto the bottom of the Dewar flask plate 20.

As an additional means of conserving heat, a well or cup-shaped receptacle 108 may be located at the top of the cover 60, such providing a space for receiving liquid nitrogen which will tend to extract heat from the tube 67 and cool the top of the various parts in the cryostat.

In place of the outside seal 64, the cover ring 63 may have a groove therein together with an O-ring against which the bottom of the cover 60 rests and against which it is forced when the cover 60 is turned to render effective the bayonet joints previously described. It is to be understood that other various means also could be used for this purpose.

From the foregoing it is evident that the double-walled Dewar flask arrangement 19 serves as a shield for heat and also serves as a means for transmitting the force from the lower tension rod 10 to the specimen 15.

It is, of course, understood that other features and arrangements can be used in which the specimen 15 is subjected to tests other than tensile, for example, compression, fatigue, torsion or shear. It is to be understood also that lower temperatures can be obtained by attaching a vacuum pump to the gas exit line and reducing the vapor pressure of the cryogen within the Dewar flask 19. Merely by way of example, the vacuum to be maintained within the spaced walls of the Dewar can be in the order of $10^{-5}$ millimeters of mercury pressure.

Referring to FIG. 2, a modified form of the invention is shown. It includes an annular member 108 that extends downwardly into the annular space between the outer and inner walls 21 and 25 instead of the semitoroidal element 23.

Additionally, the species shown in FIG. 2 includes a ball bearing 109 having its outer race mounted within a bore 110 within the bottom plate 28 of the inner can, and its inner race mounted on a stud 111 integral with the bottom wall 20 of the outer can of the cryostat. The balls of bearing 109 may be made from a heat-resistant glass such as Pyrex or the like. The purpose of the ball bearing arrangement is to provide maintenance of proper alignment between the inner and outer cans of the cryostat when force is applied to the specimen 15.

Although the various features of the new and improved cryostat have been shown and described in detail to fully disclose two embodiments of the invention, it will be evident that changes may be made in such details and certain features may be used without others without departing from the principles of the invention. For example, the forces employed to act on the specimen may be applied through the upper tension rod 12 and the top of the elements 23 by employing a force-resisting construction of the cover 60, and such construction as well as that shown in the drawings may be provided with an additional heat sink surrounding the flask.

What is claimed is:

1. A cryostat comprising in combination, an outer cylindrical wall closed at its one end; a concentric inner cylindrical wall closed at its end adjacent the closed end of said outer wall, and providing an annular chamber between said walls; an annular member integral with the ends of said cylindrical walls opposite said closed ends; a cover for said cryostat having an annular groove adapted slidingly to fit said inner and outer cylindrical walls; a central passage through said cover for receiving an upper tension rod; means integral with and on the inner side of the closed end of said inner cylindrical wall for receiving one end of a tension test specimen; and means on the exterior of the closed end of said outer cylindrical wall adapted to be connected to a lower tension rod, whereby the tension for said specimen is transmitted through the said walls of said annular chamber.

2. A cryostat comprising in combination, an outer cylindrical wall closed at its one end; a concentric inner cylindrical wall closed at its end adjacent the closed end of said outer wall, and providing an annular chamber between said walls; a semitoroidal member integral with the ends of said cylindrical walls opposite said closed ends; an alignment bearing between said closed ends; a cover for said cryostat having an annular groove adapted slidingly to fit said inner and outer cylindrical walls; a central passage through said cover for receiving an upper tension rod; means integral with and on the inner side of the closed end of said inner cylindrical wall for receiving one end of a tension test specimen; and means on the exterior of the closed end of said outer cylindrical wall adapted to be connected to a lower tension rod, whereby the tension for said specimen is transmitted through the said walls of said annular chamber.

3. A cryostat comprising in combination, an outer cylindrical wall closed at its one end; a concentric inner cylindrical wall closed at its end adjacent the closed end of said outer wall, and providing an annular chamber between said walls; a channel-shaped annular member integral with the ends of said cylindrical walls opposite said closed ends; concentrically arranged radiation shields within said annular chamber; plastic locating means at each end of said radiation shields; plastic cords under tension extending between and holding in place said plastic locating means; a cover for said cryostat having an annular groove adapted slidingly to fit said inner and outer cylindrical walls; a central passage through said cover for receiving an upper tension rod; means integral with and on the inner side of the closed end of said inner cylindrical wall for receiving one end of a tension test specimen; and means on the exterior of the closed end of said outer cylindrical wall adapted to be connected to a lower tension rod, whereby the tension for said specimen is transmitted through the said walls of said annular chamber.

4. A cryostat comprising in combination, an outer cylindrical wall closed at its one end; a concentric inner cylindrical wall closed at its end adjacent the closed end of said outer wall, and providing an annular chamber between said walls; an annular member integral with the ends of said cylindrical walls opposite said closed ends; concentrically arranged radiation shields within said annular chamber; plastic locating means at each end of said radiation shields; plastic cords under tension extending between and holding in place said plastic locating means; an alignment bearing between said closed ends; a cover for said cryostat having an annular groove adapted slidingly to fit said inner and outer cylindrical walls; a central passage through said cover for receiving an upper tension rod; means integral with and on the inner side of the closed end of said inner cylindrical wall for receiving one end of a tension test specimen; and means on the exterior of the closed end of said outer cylindrical wall adapted to be connected to a lower tension rod, whereby the tension for said specimen is transmitted through the said walls of said annular chamber.

5. A cryostat comprising in combination, an outer cylindrical wall closed at its one end; a concentric inner cylindrical wall closed at its end adjacent the closed end of said outer wall, and providing an annular chamber between said walls; an annular member integral with the ends of said cylindrical walls opposite said closed ends; a cover for said cryostat; radiation shields within said annular chamber; means integral with and on the inner side of the closed end of said inner cylindrical wall for receiving one end of a tension test specimen; an upper tension rod connected to said specimen; and means on the exterior of the closed end of said outer cylindrical wall adapted to be connected to a lower tension rod, whereby the tension for said specimen is transmitted through the said walls of said annular chamber.

6. A cryostat comprising in combination, an outer cylindrical wall closed at its one end; a concentric inner cylindrical wall closed at its end adjacent the closed end of said outer wall, and providing an annular chamber between said walls; an annular member integral with the ends of said cylindrical walls opposite said closed ends; concentrically arranged radiation shields within said annular chamber; a cover for said cryostat having an annular groove adapted slidingly to fit said inner and outer cylindrical walls; a central passage through said cover for receiving an upper tension rod; means integral with the closed end of said inner cylindrical wall for receiving one end of a test specimen, there being a connection between said upper tension rod and said specimen; and means for connecting a lower tension rod to the specimen.

References Cited by the Examiner
UNITED STATES PATENTS

| 2,044,600 | 6/36 | Williams. | |
| 3,007,596 | 11/61 | Matsch | 220—9 |
| 3,078,708 | 2/63 | McClintock | 73—15.6 |

OTHER REFERENCES

Belton et al.: "Materials for Use at Liquid Hydrogen Temperature," ASTM Special Technical Publication, No. 287, pages 108–120 (1960).

Reed: "A Cryostat for Tensile Tests in the Temperature Range 300 to 4° K.", Cryogenic Materials Data Handbook Supplement, pages 1–14 (Sept. 1961) Office of Technical Services PB 171 809–2.

Wessel: "Tenson Testing Apparatus for the Temperature Range of 320 F. to 452 F.", ASTM Bulletin 211, pages 40–46.

RICHARD C. QUEISSER, *Primary Examiner.*
DAVID SCHONBERG, *Examiner.*